Sept. 15, 1970 A. S. STERN 3,528,263
FLEXIBLE COUPLING FOR CONNECTING GENERALLY
ALIGNED AND ROTATING SHAFTS
Filed Jan. 27, 1969
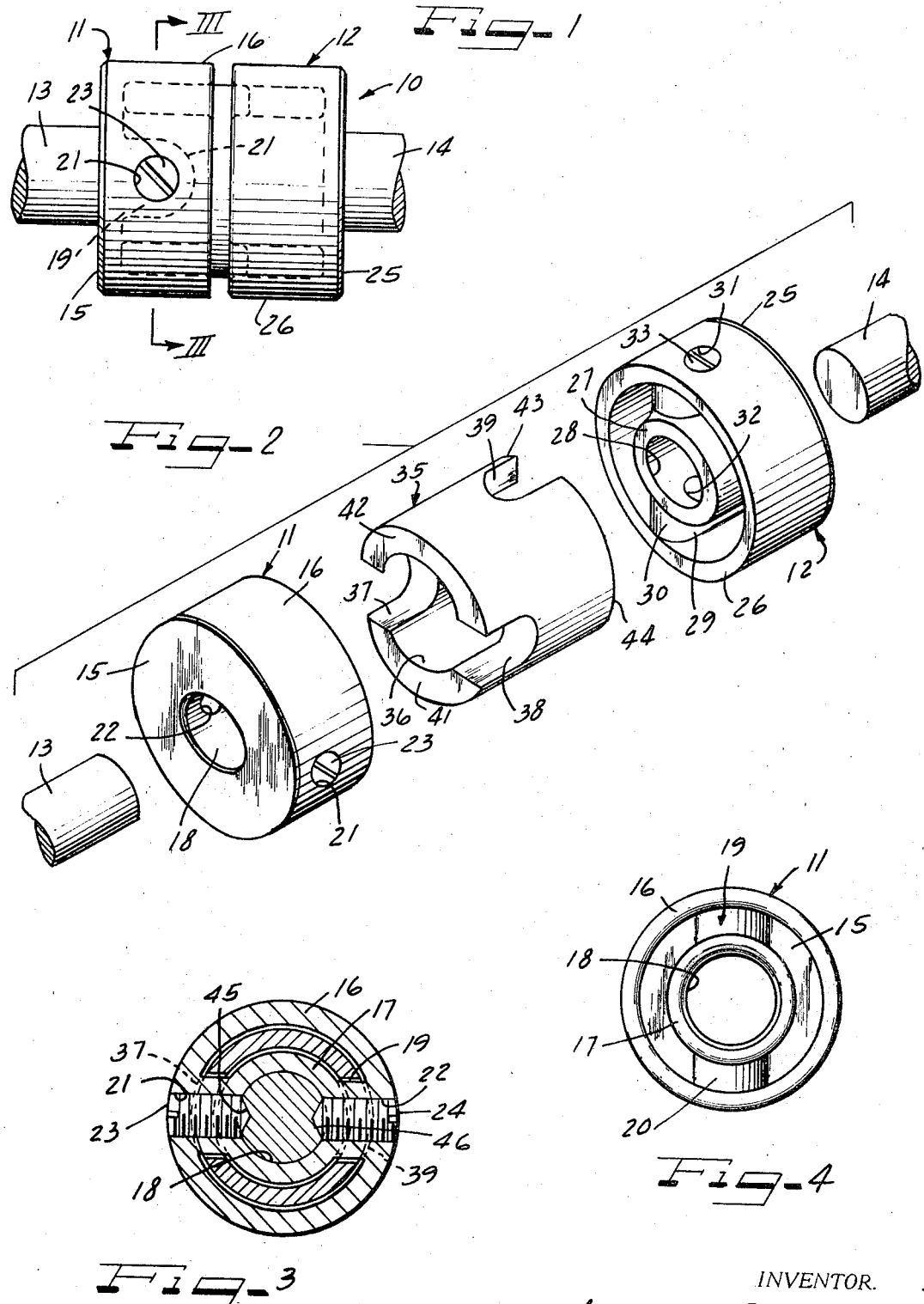
INVENTOR.
ARNOLD S. STERN
BY ATTORNEYS 3,528,263
FLEXIBLE COUPLING FOR CONNECTING GENERALLY ALIGNED AND ROTATING SHAFTS
Arnold S. Stern, 2905 W. 86th Place, Chicago, Ill. 60652
Filed Jan. 27, 1969, Ser. No. 794,017
Int. Cl. F16d 3/18
U.S. Cl. 64—9                                          7 Claims

ABSTRACT OF THE DISCLOSURE

A flexible coupling in which each of a pair of cup-shaped coupling end members is connectable to one of a pair of generally aligned rotating shafts and includes an internal diametrically located formed rib having a tapped hole extending longitudinally therethrough for receiving a pair of diametrically-opposed set screws, and an annular coaxially disposed hollow cylindrical member for receiving the corresponding shaft. A third coupling member is in the form of a hollow cylinder and has a pair of diametrically located relatively orthogonal slots in separate ends thereof for receiving the respective ribs of the end members as the end members receive the third member within the cups.

BACKGROUND OF THE INVENTION

Field of the invention

This invention relates to flexible coupling apparatus for generally aligned rotating shafts and particularly to dynamically balanced flexible coupling apparatus wherein a plurality of interlocking coupling members provide a smoothing effect in the power transfer between shafts which may be slightly misaligned.

Background of the prior art

The art recognizes flexible couplings which employ as coupling elements a pair of generally flat base members which have interlocking extending ribs, or cooperable ribs and grooves. Structurally, ribs which extend from a base suffer from the shear forces developed by the torque of the driving mechanism. Also, complex coupling apparatus is known in the art wherein springs and bearings are employed to smooth the power transfer between shafts; however, such couplings are generally undesirable for use with small shafts wherein small size and light weight are required.

Another drawback in known couplings resides in the means of securing the coupling to the shafts. A single set screw causes dynamic unbalance of the rotating mass. Also, design difficulties arise for couplings wherein the shaft diameter is smaller than a practical diameter for a set screw. In order to provide a full thread for the set screw it is necessary to notch into the central bore whereupon tightening of the set screw causes the shaft to spring or bend into the notch. Dynamic balance may be provided by a threaded connection between shaft and coupling; however, again such connections are not practical for small shaft applications.

It is therefore desirable to provide a flexible coupling for both large and small shafts which is of a simple structurally sound construction and which is dynamically balanced.

SUMMARY OF THE INVENTION

Briefly, the present invention comprises a pair of identical cup-shaped end members for connection to respective shafts. Each of the end members comprises rib means including a pair of ribs inside of the cup formed with a smooth outer edge for mating with a cooperably formed groove in the corresponding end of a center coupling member. When assembled, the center member is received by the cup-shaped end members while the ribs of the cup-shaped members are received at 90° to each other by the grooves of the center member. The ribs provide a substantial length for set screw securement therethrough, the grooves of the center coupling member effectively embracing the set screws as well as the formed ribs. Axial alignment of the coupling members is provided by cooperable mating of the central bore of the center member and a shaft embracing collar which extends through the rib of each end member.

BRIEF DESCRIPTION OF THE DRAWINGS

The invention, its organization, construction and operation will be best understood by reference to the following detailed description taken in conjunction with the accompanying single sheet of drawing, in which:

FIG. 1 is an elevational view of a flexible coupling according to the present invention shown assembled and connected to a pair of shafts;

FIG. 2 is an exploded view of the coupling illustrated in FIG. 1;

FIG. 3 is a sectional view taken generally along the line III—III of FIG. 1; and FIG. 4 is an end view of one of the cup-shaped end members as viewed toward the interior of the cup.

DESCRIPTION OF THE PREFERRED EMBODIMENT

In the drawing a flexible coupling is generally shown at 10 as comprising a pair of identical cup-shaped end members 11 and 12 for coupling shafts 13 and 14 in a substantially axially-aligned relationship for mutual rotation. End member 11 is formed as a single integral structure including annular end 15, an outer sleeve portion 16 and an inner sleeve portion 17 having an axial bore 18 for receiving shaft 13.

Rib means 19 having a curved surface 20 extends diametrically across the inside of the outer sleeve portion 16 and is centrally interrupted by the inner sleeve portion 17 to form a pair of ribs. Each of the ribs 19 and the connecting sections of the inner and outer sleeve portions 16 and 17 have tapped bores 21 and 22 formed therethrough for receiving set screws 23 and 24, respectively, which fix the coupling member to shaft 13.

End member 12 is identical to end member 11 and comprises end 25, outer sleeve portion 26, inner sleeve portion 27, an axial bore 28, rib means 29 with curved surfaces 30, tapped bores 31 and 32 and set screws 33 and 34.

Each of the end members may be formed from any suitable material; however, die cast aluminum is preferred in the example illustrated herein.

The center coupling element is in the general form of a sleeve 35 having an inner diameter of a central bore 36 which is only slightly greater than the outer diameter of the inner sleeves 17 and 27 of the end members. A plurality of U-shaped slots 37, 38, 39 and an unshown slot each receive corresponding halves of the ribs 19 and 29 as the cup-shaped end elements receive finger portions 41, 42, 43 and 44 as the coupling is assembled. The ribs and the cooperable U-shaped slots form a pair of pivots at 90° relative to each other to provide full flexibility to the coupling for smooth transfer of driving power from one shaft to the other.

Shafts 13 and 14 are illustrated as having impressions 45 and 46 (shown only in FIG. 3) which may be initially provided on the shafts, or may be provided upon tightening of the set screws.

The sleeves 35 may be a urethane or neoprene elastomer or the like, or where misalignment is minor the sleeve 35 may be formed from a semi-rigid material such as a low surface friction nylon, Delrin, or the like. It will be appreciated that the rib is entirely within the cup of an end member and the rib is integral with the inner and outer sleeve portions and with the annular end to provide a driving (or driven) element which is free of cantilevered forces. The location of the ribs and the center coupling member within the end members also prevents extrusion of the material due to pressure or distension generated by centrifugal force of the rotating coupling. Further, the thickness of the inner and outer sleeve portions and a rib section therebetween provides means for carrying a set screw without sacrificing length of the screw thereby providing sufficient thread engagement. This feature also provides a foreshortening of the coupling by placing the set screws and the pivot points at the same location.

As an example, one design of a coupling constructed in accordance with the present invention was 3/4 inch diameter by 13/16 inch long when assembled including a 1/16 inch gap between the end members and the center member was 1/64 inch less in diameter than the inner diameter of the outer sleeve portion and provided sufficient space for axial displacement of the coupling members to accommodate normal misalignment of the shafts.

Although I have described my invention by reference to a specific exemplary embodiment, many changes and modifications may be made in the invention by those skilled in the art without departing from the spirit and scope of the invention as defined in the appended claims.

What I claim as my invention is:

1. Coupling apparatus for joining a pair of substantially aligned shafts for mutual rotation, comprising:
    a pair of cup-shaped elements each of which includes a diametrically disposed rib means within the cup and means for securing the cup-shaped element to a corresponding one of the shafts; and
    a coupling member positionable within each of said cup-shaped elements and including means forming orthogonally related slots in respective ends of the coupling member for receiving said rib means as said coupling member is received by said cup-shaped elements.

2. The coupling apparatus defined in claim 1, wherein each of said cup-shaped elements comprises: a base portion; an inner sleeve portion extending from said base and having an axial bore therethrough for receiving the corresponding shaft; and an outer sleeve portion, said rib means joining said inner and outer sleeve portions.

3. The coupling apparatus defined in claim 2, wherein each said rib means includes a pair of ribs, each of said ribs extending between said inner and outer sleeve portions, and said means for securing a cup-shaped element to its corresponding shaft comprises a pair of passageways extending through said inner and outer sleeves and respective ribs, and a pair of set screws extending through respective ones of said passageways.

4. The coupling apparatus defined in claim 1, wherein each of said slots is U-shaped and wherein each of said rib means includes curved surfaces for cooperable sliding engagement with said slots.

5. Flexible coupling apparatus for connecting a pair of rotatable shafts for mutual rotation with their longitudinal axes of the shafts in substantial alignment, comprising:
    a pair of coupling members each of which includes a planar portion having an aperture therethrough for receiving a corresponding one of said shafts, first and second concentric sleeve portions integral with and extending from said planar portion, and rib means integral with said planar portion and said first and second sleeves and extending therefrom along the inner diameter of said first sleeve portion, said second sleeve portion including an axial bore in communication with the aperture of said planar portion to receive the corresponding shaft, and means connecting said first and second sleeve portions and said rib means to the corresponding shaft; and
    a center sleeve having an inner diameter greater than the outer diameter of said second sleeve portion and an outer diameter less than the inner diameter of said first sleeve portion for insertion between said first and second sleeve portions of each of said coupling members, and comprising formed means at each end thereof for embracing said rib means of each of said coupling members in sliding relation.

6. The flexible coupling apparatus set forth in claim 5, wherein each of said rib means includes a pair of ribs, each of said ribs having an arcuately curved surface, and each of said formed means includes wall means defining notches shaped in conformity to the arcuate curvature of said curved surfaces of said rib means, the notches at one end of said center sleeve being located at one angular position and the notches at the other end being located at another angular position, the associated ribs and notches forming a pair of pivots to compensate for misalignment of said shafts.

7. The flexible coupling apparatus set forth in claim 6, wherein said means for connecting said first and second sleeve portions and said rib means to the corresponding shaft comprises a pair of passageways each extending through a separate one of said ribs and said inner and outer sleeve portions, and a pair of threaded set screws each of which is disposed in threaded engagement with a separate one of said passageways for tightening against the corresponding shaft.

References Cited

UNITED STATES PATENTS

| | | | |
|---|---|---|---|
| 1,227,432 | 5/1917 | Grimes | 64—9 |
| 1,650,557 | 11/1927 | Weingartner | 64—6 XR |
| 2,743,592 | 5/1956 | Nagy | 64—9 |
| 3,406,534 | 10/1968 | Chapper. | |

JAMES A. WONG, Primary Examiner